3,029,150
METHOD OF CURING MEAT AND COMPOSITION THEREFOR
Wilhelm Bickel, Mannheim, Germany, assignor to Joh. A. Benckiser G.m.b.H., Ludwigshafen (Rhine), Germany
No Drawing. Filed May 23, 1955, Ser. No. 510,511
In France Jan. 7, 1948
8 Claims. (Cl. 99—222)
Public Law 619, Aug. 23, 1954
Patent expires Jan. 7, 1968

The present invention relates to sausage and meat products and to a method of making the same.

It is an object of the present invention to cause retention of moisture in sausage and meat products.

It is another object of the present invention to provide sausage and meat products which will remain stable over a prolonged period of time.

It is yet another object of the present invention to provide sausage and meat products in which the different meat constituents are joined together with water into a homogeneous mass of uniform and stable structure.

Other objects and advantages will become apparent from the following description and the appended claims.

With the above objects in view, the present invention mainly consists in a meat product comprising, in combination, a ground meat having intimately admixed therewith and distributed therethrough at least one soluble polymeric phosphate and water.

The present invention also includes in a method of producing meat products the step of mixing ground meat with at least one water-soluble polymeric phosphate and water so as to swell the meat and to cause the same to retain moisture and thereby to remain stable over prolonged periods of time.

The present invention is based on the surprising discovery that the polymeric phosphates not only possess the characteristics of being capable of inhibiting coagulation, similarly to citrates and other compounds, but that in addition, and distinct from other anti-coagulants, the polymeric phosphates are also capable of binding water to animal albumen with swelling of the same. Due to this quality of the polymeric phosphates a great improvement in the structure and stability of sausage meat and other chopped meat products can be obtained, resulting in a joining together of the different constituents of the meat, such as fat and albumen, with the natural water thereof and with the permissable quantities of additional water into a homogeneous mass. Thus it is possible to work up into sausage meat and other meat products not only fat meats in which the fat serves in the manner of a binding agent but also lean meats and meats with low water content such as are obtained for instance from animals slaughtered after prolonged transportation. Excellent results are also obtained in working up frozen meats when the same are treated with polymeric phosphates in accordance with the present invention.

According to the present invention it is also possible to produce sausage meat and other meat products of excellent structure, texture and storage quality without the addition of blood, or with the addition of blood which does not contain polymeric phosphates as anti-coagulants.

The polymeric phosphates which may be used in accordance with the present invention include the water-soluble salts of pyrophosphoric acid, metaphosphoric acid and polyphosphoric acids. Salts of phosphoric acids of varying degree of polymerization may be used and in accordance with a preferred embodiment of the present invention, potassium polyphosphates of a high degree of polymerization are used in combination with sodium salts the presence of which is necessary in order to make the high polymerized potassium polyphosphates water-soluble.

It is equally within the scope of the present invention to use a single one of the aforementioned salts or to use a mixture containing more than one of these salts.

In preferred embodiments of the present invention one or a mixture of the following polymeric phosphates are used:

$Na_2H_2P_2O_7$ (disodium pyrophosphate)
$Na_4P_2O_7$ (tetrasodium pyrophosphate)
$Na_5P_3O_{10}$ (sodium tripolyphosphate)
$Na_6P_4O_{13}$ (sodium tetrapolyphosphate)

The potassium and ammonium salts corresponding to the above-listed sodium salts.

The polymerized sodium and ammonium metaphosphates having a degree of polymerization ranging from 5 to 250 and generally corresponding to the formula $(NaPO_3)_x$, wherein $x$ indicates the degree of polymerization.

The polymerized potassium metaphosphates having a degree of polymerization ranging from 5 to 8,000 and generally corresponding to the formula $(KPO_3)_x$, wherein $x$ indicates the degree of polymerization and to which have been added sodium salts such as NaCl, $Na_2SO_4$, $(NaPO_3)_x$ etc., in order to make the potassium salt water-soluble. Sodium salts are usually added in a quantity amounting to between about 10% and 100% by weight of the quantity of potassium salts used.

Excellent results are obtained by using as polymeric phosphate according to the present invention Graham's salt which corresponds to the general formula $(NaPO_3)_x$, wherein the value of $x$ may range from about 50 to about 250; and also by using Kurrol's salts which corresponds to the general formulas $(KPO_3)_x$, and $(NaPO_3)_x$, and wherein the value of $x$ may range from about 50 to about 8000. When using Kurrol's salts it is of course necessary to add another sodium salt in order to make Kurrol's salts water-soluble.

In accordance with preferred embodiments of the present invention, polymeric phosphates are mixed into the ground meat in a quantity corresponding to approximately between 0.1 and 2% of the weight of the meat, more preferably between 0.15 and 0.5% of polymeric phosphates are used and most preferably approximately 0.3%.

The individual mechanical steps of chopping meat and mixing the chopped meat with polymeric phosphates and water, and if desired also with blood in accordance with the method of the present invention, and in order to obtain the product of the present invention, are performed with equipment and in a manner well known in the art.

When it is desired to add blood to the chopped meat or sausage product, it is preferred in accordance with the present invention to first mix the chopped or ground meat with the soluble polymeric phosphate so that the same can have its action on the chopped meat, and subsequently to add the blood to the mixture of the chopped meat and the polymeric phosphate.

The following examples are given as illustrative only, the scope of the invention, however, not being limited to the specific examples.

*Example 1*

40 kilograms of beef meat of poor grade which generally cannot be worked up into sausage meat of high quality and stability, are cut into small pieces. The cut meat, together with 120 grams of a mixture of sodium metaphosphate and sodium pyrophosphate having a pH of 7, are passed through a meat chopper. 10 kilograms of chopped ice are thoroughly mixed into the thus obtained chopped mass. The mixture is then allowed to stand overnight. The next day the mixture is again passed through a meat chopper while 5 liters of water are added thereto. The thus obtained mass may then immediately be filled into sausage casings.

The sausage obtained thereby is of great stability, and, in contrast to sausage similarly produced but without the addition of polymeric phosphates, binds and retains all of the water that has been added thereto.

*Example 2*

40 kilograms of frozen meat are chopped in the manner usual in the preparation of sausage meat, with the addition of 3 liters of a 5% aqueous solution of sodium chloride in which 150 grams of a potassium metaphosphate of a high degree of polymerization (Kurrol's salts) have been dissolved. Thereafter 17 liters of ice water are thoroughly mixed into the mass. The thus prepared sausage meat retains water and its structure equally well as the meat product prepared according to Example 1. It can now immediately be stuffed into casings.

*Example 3*

A mixture of 3.5 kilograms beef and 3.5 kilograms pork is salted with 250 grams of nitrite corning salt and allowed to stand in a cool room for 2 days. Thereafter the meat is finely chopped and mixed with 1.5 kilograms of finely chopped ice in which 5 grams sodium metaphosphate, 5 grams sodium tetrapolyphosphate and 5 grams tetrasodium pyrophosphate have been distributed. The mixture is allowed to stand for 24 hours in flat dishes and is thereafter again thoroughly worked under the addition of a further quantity of 1.5 kilograms finely chopped ice including 5 grams sodium metaphosphate, 5 grams sodium tetrapolyphosphate and 5 grams tetrasodium pyrophosphate, spices and 3 kilograms lard. The mixture is now filled into natural sheep's casings, pre-dried for a short period of time and thereafter cold-smoked for 45 minutes.

A sausage of excellent homogeneous structure, texture and storage quality is thus obtained.

*Example 4*

6 kilograms meat of young porkers together with 3 kilograms bacon are finely chopped and worked with spices, 225 grams nitrite corning salt, 27 grams sodium tetrapolyphosphate and 2.7 kilograms finely chopped ice. The thus obtained mass is filled into natural sheep's casings pre-dried and cold-smoked.

*Example 5*

6 kilograms beef, 2 kilograms pork and 2 kilograms lard are salted with 250 grams of nitrite corning salt and finely chopped. Thereafter the chopped mixed meat is thoroughly worked under addition of 3 kilograms chopped ice, spices and a mixture of 15 grams of sodium tripolyphosphate and 15 grams sodium tetrapyrophosphate. The thoroughly worked mass is filled into natural sheep's casings, air-dried and smoked.

*Example 6*

2.5 kilograms fat back, 1 kilogram beef and 0.5 kilogram bacon are cut into small cubes, salted with 100 grams of nitrite corning salt, throughly mixed with 3 grams sodium metaphosphate and 3 grams tetrasodium pyrophosphate, and allowed to stand for 2 days. Thereafter the mass is put through a meat grinder and thoroughly worked with an additional 3 grams sodium metaphosphate and 3 grams tetrasodium pyrophosphate plus 1.2 kilograms finely chopped ice. The worked mass is quickly dried, hot-smoked and subsequently boiled.

*Example 7*

3.5 kilograms fresh pork liver are cut in slices and boiled. 4 kilograms pork and 2.5 kilograms boiled lard are cut in small pieces and mixed with the liver. The mixture is ground through a meat grinder set at 2 millimeters, and worked with spices, 250 grams nitrite corning salt, 70 grams potassium metaphosphate, 20 grams disodium pyrophosphate and 110 grams tetrasodium pyrophosphate. The worked mass is stuffed into casings and simmered for 50 minutes in slightly boiling water. Thereafter the finished sausage is cooled with ice water.

*Example 8*

3.5 kilograms bacon are boiled and cut in cubes. 2.5 kilograms pork lungs are boiled and put through a meat grinder. 2.5 kilograms pork tongue are boiled and cut in small cubes. 1.5 liters pork blood are treated with sodium citrate in order to prevent coagulation. Thereafter the bacon cubes are quickly boiled and, while hot, mixed with the chopped pork lung and the pork blood. The cubed tongue is added to the mixture. 250 grams sodium chloride, 5 grams disodium pyrophosphate and 25 grams tetrasodium pyrophosphate are added as well as spices. After thoroughly working the entire mass, it is stuffed into natural pork or beef casings and the thus prepared sausage is quickly cooled and smoked for 4 days in cold smoke.

*Example 9*

25 kilograms pork are finely chopped and salted with 600 grams of nitrite corning salt. 25 grams sodium metaphosphate and 50 grams sodium tripolyphosphate are mixed into the chopped meat. The mixture is allowed to stand for 1 hour. Thereafter 2.4 kilograms blood plasma, made by centrifuging sodium citrate-treated blood of slaughtered animals, are added together with 5 kilograms finely chopped ice and the customary spices. After thoroughly working the mass, it is filled into casings, smoked and boiled.

*Example 10*

4 kilograms liver are finely ground through a meat grinder and mixed with 6 kilograms boiled and ground fat back, spices, 80 grams blood plasma powder dissolved in 0.8 liters water, and 30 grams tetrasodium pyrophosphate are thoroughly worked into the liver and fat back mixture. The mass is filled into casings, heated for 2 hours in a bath of water of 80° C., thereafter cooled with cold water and dried.

*Example 11*

3 kilograms beef, 6 kilograms pork, 1 kilogram veal, 250 grams nitrite corning salt, 6 grams sodium tetrapolyphosphate and 9 grams tetrasodium pyrophosphate are put together through a meat grinder and thereafter thoroughly worked with spices and 3 kilograms of finely chopped ice. The mass is filled in casings, smoked and boiled.

*Example 12*

5 kilograms lean meat and 5 kilograms lard are put through the meat grinder and thereafter thoroughly worked with 4 kilograms finely chopped ice, 250 grams nitrite corning salt, 10 grams potassium metaphosphate and 40 grams tetrasodium pyrophosphate. The worked mass is stuffed into casings, boiled and smoked.

The sausages produced according to the foregoing examples were all of excellent, firm, homogeneous structure and consistency.

*Example 13*

6 kilograms lean beef and 4 kilograms fat pork were ground separately. The ground beef was then worked with 250 grams nitrite corning salt 10 grams potassium metaphosphate, 40 grams tetrasodiumpyrophosphate and and 6 kilograms finely chopped ice, and allowed to stand overnight. The following day it is thoroughly worked with the previously ground 4 kilograms of fat pork, stuffed into casings, hot-smoked and boiled.

*Example 14*

The sausage is made exactly as described in Example 13 with the exception that potassium metaphosphate and tetrasodium pyrophosphate are omitted.

Upon comparing the finished products made according to Example 13 and Example 14 it is found that the sausage according to Example 13 fills the casing completely without showing any wrinkles, while the sausage made according to Example 14 has a dried-out, wrinkled, unappetizing appearance.

Upon cutting it is found that the sausage according to Example 13 has a smooth, homogeneous structure, the meat particles adhering to each other very well and the sausage, even when thinly sliced, maintaining its uniformity and firmness. In contrast thereto, the sausage according to Example 14 shows upon cutting a rough and uneven surface with cracks and holes therein. It is not possible to thinly slice the sausage made according to Example 14 since the meat particles do not adhere well to each other and the slice breaks into several pieces.

A marked difference in taste is observed whereby the sausage made according to Example 13 has the desired taste, whereas the sausage made according to Example 14 has a definitely unsatisfactory off-taste.

Substantially similar results were obtained in comparing the sausages made as per Examples 1 through 12 in accordance with the present invention, with sausages made by following exactly the same procedures as described in Examples 1 to 12 but not having any polymeric phosphates added thereto.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of producing meat products, the step of adding to and mixing with ground meat water and a mixture of two different water soluble salts of pyrophosphoric acid in an amount of at least 0.1% by weight of said ground meat so as to swell the meat by combining the added water thereto and to cause the meat to retain the added water and thereby to remain stable over prolonged periods of time.

2. In a method of producing meat products, the step of adding to and mixing with ground meat water and a mixture of disodium pyrophosphate and tetrasodium pyrophosphate in an amount of 0.1–2% by weight of said ground meat and in an approximate ratio of disodium pyrophosphate to tetrasodium of pyrophosphate of 1:5 so as to swell the meat by combining the added water thereto and to cause the meat to retain the added water and thereby to remain stable over prolonged periods of time.

3. In a method of producing meat products the step of adding to said meat products at least about 0.1% by weight of the weight of the meat of a water soluble salt of pyrophosphoric acid in the presence of moisture so as to stabilize the moisture within the meat product.

4. In a method of producing meat products the step of adding to said meat products a mixture of at least about 0.1% by weight on the weight of the meat of at least two different polymeric phosphates at least one of which is a salt of pyrophosphoric acid in the presence of moisture so as to stabilize the moisture within the meat product.

5. In a method of producing meat products the step of adding to said meat products in the presence of a curing agent at least 0.1% by weight on the weight of the meat of a water soluble salt of pyrophosphoric acid in the presence of moisture so as to stabilize and bind the moisture in the meat product.

6. In a method of producing cured meat products the step of adding to said meat products a curing agent and a mixture of at least about 0.1% by weight on the weight of the meat of at least two different polymeric phosphates, at least one of which is a salt of pyrophosphoric acid in the presence of moisture so as to stabilize and bind the moisture in the meat product.

7. A composition for treating meat in the presence of moisture to bind and stabilize the moisture in the meat consisting essentially of an admixture of a curing agent and an effective amount of water soluble salt of pyrophosphoric acid.

8. A composition for treating meat in the presence of moisture to bind and stabilize the moisture in the meat consisting essentially of an admixture of a curing agent and an effective amount of a mixture of at least two different polymeric phosphates at least one of which is a salt of pyrophosphoric acid.

References Cited in the file of this patent

UNITED STATES PATENTS

| | | |
|---|---|---|
| 2,241,868 | Reimann | May 13, 1941 |
| 2,442,663 | Rinehart | June 1, 1948 |
| 2,513,094 | Hall | June 27, 1950 |
| 2,596,067 | Brissey | May 6, 1952 |
| 2,852,392 | Huber et al. | Sept. 16, 1958 |

FOREIGN PATENTS

| | | |
|---|---|---|
| 696,617 | Great Britain | Sept. 2, 1953 |

OTHER REFERENCES

"The National Provisioner," July 31, 1954, page 26.
"The National Provisioner," August 21, 1954, pages 6 and 7.